US006525248B2

(12) United States Patent
Chatkeonopadol

(10) Patent No.: US 6,525,248 B2
(45) Date of Patent: Feb. 25, 2003

(54) INSTRUMENT OR WIND CHIME

(75) Inventor: Isres Chatkeonopadol, Bangkok (TH)

(73) Assignee: Roland Meinl Musikinstrumente GmbH & Co., Neustadt/Aisch (DE)

( * ) Notice: Subject to any disclaimer, the term of this patent is extended or adjusted under 35 U.S.C. 154(b) by 0 days.

(21) Appl. No.: 09/875,962

(22) Filed: Jun. 8, 2001

(65) Prior Publication Data

US 2001/0049992 A1 Dec. 13, 2001

(30) Foreign Application Priority Data

Jun. 8, 2000 (EP) ........................................ 00112272

(51) Int. Cl.[7] ........................................ G01D 13/08

(52) U.S. Cl. ........................................ 84/402; 84/403

(58) Field of Search ........................................ 84/402, 403

(56) References Cited

U.S. PATENT DOCUMENTS 4,881,442 A * 11/1989 Stevens ........................ 84/403

* cited by examiner

*Primary Examiner*—Shih-Yung Hsieh
(74) *Attorney, Agent, or Firm*—Browdy and Neimark, P.L.L.C.

(57) ABSTRACT

An instrument or wind chime comprises an elongated suspender rod from which a plurality of sounding bodies are suspended and dangle at a distance from each other, the suspender rod being provided with a folding joint.

4 Claims, 1 Drawing Sheet

INSTRUMENT OR WIND CHIME

BACKGROUND OF THE INVENTION

1. Field of the Invention

The invention relates to a musical instrument or a wind chime comprising a suspender rod and a plurality of sounding bodies that are fixed thereto and dangle there from.

2. Background Art

Instruments of the generic type are conventionally designated as chimes. The sounding bodies are usually rod-shaped and may be formed by solid rods or by pipes. When the sounding bodies are touched, the varying lengths produce varying notes. In the wind chime, the desired sound is generated by the individual sounding bodies touching under the action of the wind.

The suspended attachment of the sounding bodies is implemented by the suspender rod being provided with drilled holes, by another drilled hole being provided at the upper ends of the sounding bodies and by threads or wires being passed through the respective drilled holes.

A drawback of chimes of the species, which have comparatively long suspender rods, resides in their unwieldiness during transport and storage.

SUMMARY OF THE INVENTION

It is an object of the invention to embody an instrument or wind chime of the type mentioned at the outset such that, as opposed to conventional designs, greater ease of transport and more convenient safekeeping are ensured on the one hand and entirely novel sound effects are achievable on the other hand.

According to the invention, this object is attained in that the suspender rod is equipped with a folding joint.

A considerably compacter way of handling is ensured by the collapsibility of the suspender rod. Moreover, entirely novel sound effects are achieved, because two rows of directly adjacent sounding bodies originate, which hit against each other when touched or moved by the wind.

In keeping with another embodiment of the invention, it is provided that the suspender rod is fixable in the folded condition. In this way, not only safekeeping of the folded instrument is possible, but it can also be played.

By advantage, this fixation is put into practice by the suspender rod having drilled holes which are in alignment in the folded condition, serving for insertion of a fixing bolt.

Favorably, the folding joint is also fixable in the unfolded condition, the suspender rod thus being stabilized.

By advantage, a pivotable, snap-in locking bow is provided for the folding joint to be fixed.

An especially attractive appearance and advantageous playing technique result from the length of the sounding bodies increasing from the middle outwards.

Details of the invention will become apparent from the ensuing description of a preferred embodiment, taken in conjunction with the drawing.

DESCRIPTION OF THE PREFERRED EMBODIMENT

Figure 1:
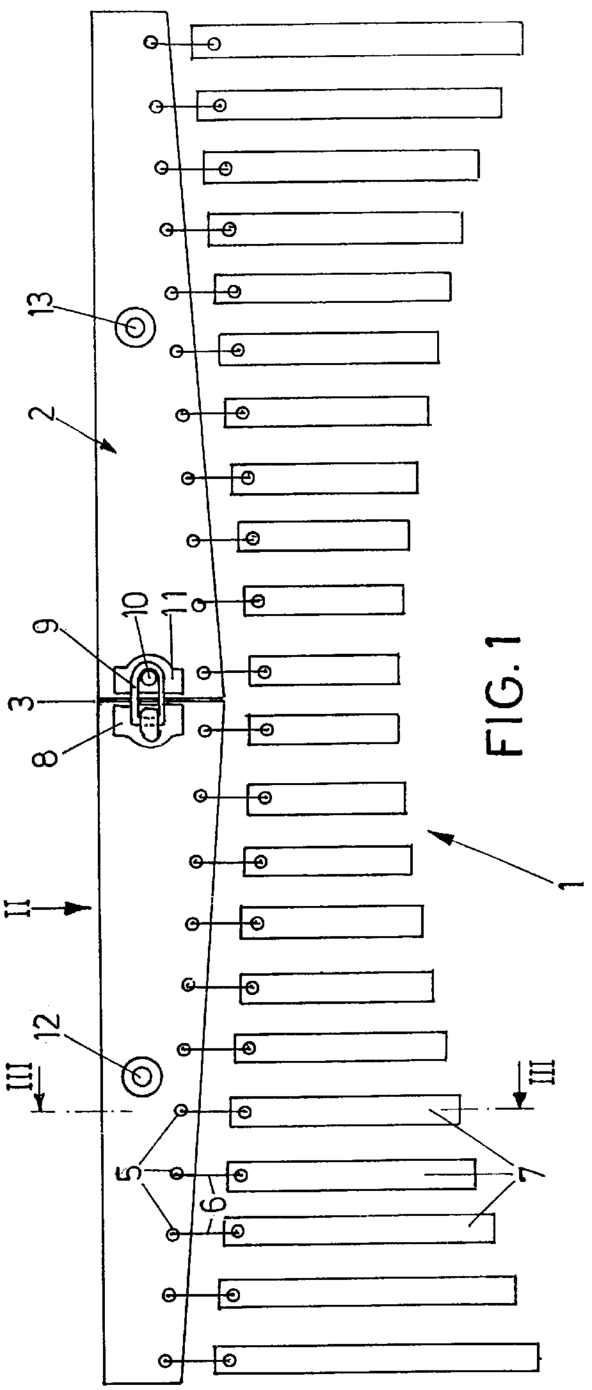
FIG. 1 is a view of a musical instrument according to the invention.
Figure 2:
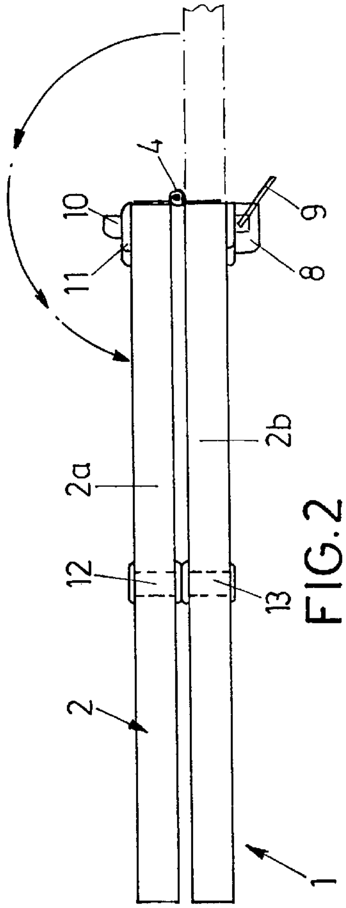
FIG. 2 is a plan view of the instrument of FIG. 1 when folded.
Figure 3:
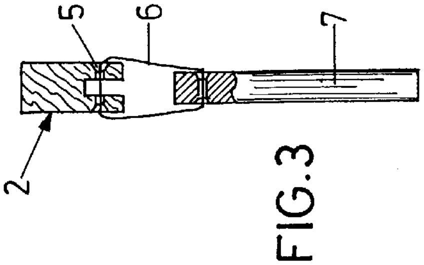
FIG. 3 is a section on the line III—III in FIG. 1.

As seen in the drawing, an instrument 1 according to the invention in the form of a chime comprises an elongated suspender rod 2, which is divided in the middle 3 and provided with a pivot or folding joint 4 of the type of a hinge.

The suspender rod 2 is provided with a plurality of drilled holes 5, to which cylindrical sounding bodies 7 are fixed by way of threads 6. The length and thus the pitch of the sounding bodies 7 increases outwards, starting from the middle 3.

In the vicinity of the pivot joint 4, a locking bow 9 is pivotably positioned on a mounting part 8 in such a way that it can snap-engage with a locking projection 10, the locking projection being disposed on a mounting part 11 which is attached to the other part of the suspender rod 2.

The two parts 2*a*, 2*b* of the suspender rod 2 have drilled holes 12, 13 which are in alignment when the suspender rod 2 is folded and into which a fixing bolt can be inserted for fixation in the folded condition.

What is claimed is:

1. An instrument or wind chime comprising an elongated suspender rod from which a plurality of sounding bodies are suspended and dangle at a distance from each other, wherein the suspender rod (2) is provided with a folding joint (4), wherein the folding joint (4) is fixable in the unfolded condition, and wherein a pivotable snap-in locking bow (9) is provided for fixation of the pivot joint (4).

2. An instrument according to claim 1, wherein the suspender rod (2) is fixable in the folded condition.

3. An instrument according to claim 2, wherein the suspender rod (2) has drilled holes (5) which are in alignment in the folded condition, serving for insertion of a fixing bolt.

4. An instrument according to claim 1, wherein the length of the sounding bodies (7) increases, starting from the middle (3) of the suspender rod (2).

* * * * *